United States Patent [19]

Booth

[11] 4,052,549

[45] Oct. 4, 1977

[54] PROCESS FOR PREPARING TERPENE POLYMER COMPOSITIONS

[75] Inventor: James William Booth, Panama City, Fla.

[73] Assignee: Arizona Chemical Company, Wayne, N.J.

[21] Appl. No.: 689,421

[22] Filed: May 24, 1976

Related U.S. Application Data

[63] Continuation-in-part of Ser. No. 549,233, Feb. 12, 1975, abandoned, which is a continuation of Ser. No. 422,394, Dec. 6, 1973, abandoned.

[51] Int. Cl.$^2$ .......................... C08F 4/14; C07C 13/28
[52] U.S. Cl. ................................ 526/237; 260/675.5; 260/887; 428/483; 526/281; 526/282; 526/308
[58] Field of Search ............... 526/237, 281, 282, 308; 260/675.5

[56] References Cited

U.S. PATENT DOCUMENTS 3,401,136  9/1968  Sellers ............................. 260/29.8

Primary Examiner—Stanford M. Levin
Attorney, Agent, or Firm—Harry H. Kline

[57] ABSTRACT

Terpene polymer compositions that have softening points in the range of 0° C. to 85° C. and that are useful as components of hot melt coating compositions, adhesives, and the like, are copolymerized employing from about 20% to 80%, oligomers of cyclic monoterpene hydrocarbons, such as dipentene dimer and/or trimer, and from 80% to 20% of a terpene monomer, such as β-pinene, dipentene or mixtures thereof, said percentages being by weight.

6 Claims, No Drawings

PROCESS FOR PREPARING TERPENE POLYMER COMPOSITIONS

This application is a continuation-in-part of my copending application, Ser. No. 549,233 filed on Feb. 12, 1975, now abandoned, which in turn is a continuation of application, Ser. No. 422,394, filed on Dec. 6, 1973, now abandoned.

The present invention relates to novel compositions of matter. More particularly, it relates to terpene resin compositions having softening points below approximately 90° C. and to methods for the production of these compositions. Still more particularly, it relates to resinous terpene compositions prepared by copolymerizing a terpene monomer and an oligomer.

It is well known that dipentene can be polymerized to form solid resinous products that are useful in the manufacture of paper coatings, adhesives, rubber compounds, and other industrial products. In the process ordinarily used for the preparation of these resinous products, dipentene is polymerized in hydrocarbon solution in the presence of a Friedel-Crafts catalyst, such as aluminum chloride. The resulting polymer solution is treated first with lime and an adsorbent material, such as fuller's earth or finely-divided clay, so as to destroy the catalyst and then is heated to dechlorinate it. After filtration, the filtrate is distilled to separate from the polymer, low boiling materials including the solvent and dipentene oligomers. The dipentene resins resulting from this procedure are hard brittle products that have softening points above 90° C. and generally in the range of 100° C. to 140° C. While these polymers can be used in many adhesive applications, they are not satisfactory for use in hot melt coating compositions and other products where the use of products having lower softening points and greater toughness is required.

Conventionally, polyterpenes used in hot-melt or pressure-sensitive applications are homopolymers of dipentene or $\beta$-pinene, respectively. Dipentene homopolymers provide high compatibility, good gloss, and low water vapor transmission to hot-melt coatings. However, their low cohesive strength and stiffness render them unsuitable for use as pressure-sensitive adhesives. $\beta$-Pinene homopolymers, on the other hand, provide optimum tack and shear strength in pressure-sensitive adhesives and are preferred in such application. Their lower compatibility and higher water vapor transmission render them unsuitable for hot-melt coatings.

Attempts have also been made to obtain terpene resins of varying softening points by physically blending high molecular weight dipentene polymers with low molecular weight oligomers (dipentene dimers or trimers). These are described in the U.S. Pat. No. 3,401,136 to Sellers, issued on Sept. 10, 1968. The method requires a first source of premanufactured dipentene polymers, a second source of premanufactured dimers, and followed by operations involving melting and blending. Even then, the product obtained is no more than a physical blend of high and low molecular weight terpenes resulting in a bimodal resin. Such a blend reflects the poorest properties of individual components in specific applications and results in inferior adhesives.

It is, therefore, an object of the invention to provide a process for preparing soft terpene resins which are low molecular weight resins.

A further object is to provide soft terpene resins which are low molecular weight resins.

A still further object is to provide a simple, direct process for preparing soft terpene resins having specific softening points.

These and other objects of the invention will become apparent from a reading of the following ensuing description.

In accordance with the present invention, it has now been found that terpene resin compositions that have softening points in the range of approximately 0° C. to 85° C. and that have toughness and viscosity characteristics that make them valuable as components of hot melt coating compositions, adhesives, and the like can be obtained by copolymerizing an oligomer of a cyclic monoterpene hydrocarbon with a terpene monomer. Suitable illustrative monomers are, for instance, $\beta$-pinene, dipentene or mixtures thereof. $\beta$-Pinene is a natural product, occuring as a minor component of gum or sulfate turpentine. Hackh's Chemical Dictionary, McGraw-Hill Book Company, New York, N.Y., U.S.A., fourth edition (1969), page 697, defines the following turpentine compositions (in percentages) in the table below:

TABLE I

| Terpene | Gum turpentine | Wood turpentine | Sulfate turpentine |
| --- | --- | --- | --- |
| $\alpha$-Pinene | 60–65 | 75–80 | 60–70 |
| $\beta$-Pinene | 25–35 | Nil | 20–25 |
| Camphene | — | 4–8 | — |
| Other terpenes | 5–8 | 15–20 | 6–12 |

It is readily apparent, therefore, that in spite of the increased demand for $\beta$-pinene homopolymers, the supply of raw material for this use is essentially limited and insufficient to meet increasing demands.

Dipentene may either be a natural product, commonly know as limonene, or may be obtained synthetically by isomerization of $\alpha$-pinene.

As used herein, the term "oligomers of cyclic monoterpene hydrocarbons" relates to low molecular weight polymers of cyclic terpene hydrocarbons that have the formula $C_{10}H_{16}$, for example, dipentene, limonene, $\alpha$-pinene, $\beta$-pinene, carenes, and mixtures thereof. These oligomers are preferably dimers or mixtures of dimers and trimers which may contain a small amount of tetramers. They generally have boiling points in the range of 170° C. to 240° C. at 10 mm. Hg. and molecular weights in the range of 270 to 450.

In general, the oligomers can be obtained by any suitable and convenient procedure. For example, they may be obtained from the low boiling fraction that is separated from dipentene polymers prepared by the aforementioned procedure. This fraction which contains approximately 30% to 50%, by weight, of hydrocarbon solvent, 65% to 45%, by weight, of dipentene oligomers, and about 5%, by weight, of dipentene polymer is distilled to remove solvents.

As an alternative procedure, oligomers can be prepared by the polymerization of turpentine in the presence of a Friedel-Crafts catalyst and a hydrocarbon solvent. After distillation to remove the solvent, the turpentine polymer contains approximately 5% to 15%, by weight, of terpene monomers, 50% to 90%, by weight, of terpene oligomers, and 5% to 40%, by weight, of terpene polymers. This material may be distilled to separate the oligomers from the other components, or it can be used without further purification to produce the dipentene polymer compositions of this invention.

In another embodiment of these invention, terpene oligomers, predominately dimers and trimer oils, can be combined with polymerizable monoterpenes, such as dipentene, beta-pinene, or α-pinene and added to a hydrocarbon solvent containing a Friedel-Crafts catalyst, such as aluminum chloride or aluminum bromide. The oligomers then copolymerize with the monomer to produce a resin of the desired softening point directly by controlling the ratio of oligomer and monomer between 80:20 and 20:80, respectively. These resins display a molecular weight distribution which defines viscosities different from those of bimodal blends prepared by the prior practice.

The invention is further illustrated by the examples that follow. It is to be understood, however, that these examples are given solely for the purpose of illustration and that the invention is not to be regarded as being limited to the specific materials or conditions recited therein except as set forth in the appended claims. Unless otherwise specified, all percentages are percentages by weight.

EXAMPLES 1 to 8

Three parts of aluminum chloride are added to a mixture of 80 parts mixed xylene and 50 parts of a terpene oligomer in a suitable reactor with provision for stirring and cooling. A monomer mixture of ACINTENE B®, (Arizona Chemical Co., β-pinene), 10 parts plus ACINTENE DP®, (Arizona Chemical Co., dipentene), 40 parts are then added slowly. The reaction temperature is allowed to rise to 50° C. and is then maintained at that temperature by external cooling and the rate of monomer addition. After monomer addition has been completed, the reaction is stirred for an additional fifteen minutes at a maximum temperature of 50° C. The aluminum chloride catalyst is removed by drowning the reaction mixture in water, followed by distilled water washes until the wash water is found to be neutral. The solvent is removed by vacuum distillation. The resin produced had characteristics dependent on the monomer feedstock, as shown in the table below:

EXAMPLES 9–16

The procedure of Examples 1–8 above is followed in every respect except that the oligomer and monomer in each example are admixed prior to addition to the catalyst mixture. Similar results as tabulated in the above Table II are noted.

EXAMPLE 17

This example illustrates the utility of the copolymer of Example 2 as a tackifier.

NATSYN® 400, a synthetic polyisoprene rubber manufactured by Goodyear Rubber Company, is milled to 45 Mooney viscosity and is then dissolved in toluene at 12.5% solids. The following formulation is prepared by the solution of additional ingredients in the rubber solution. The parts are expressed as parts by weight per hundred parts of rubber.

| FORMULATION | |
|---|---|
| Ingredients | Parts |
| NATSYN®400 | 100 |
| 2,2'-methylenebis-4-methyl-6-tertiary-butyl phenol | 0.5 |
| dilaurylthiodipropionate | 0.5 |
| polyterpene resin Ex. 2 | 40 |

This formulation is coated on Mylar film from solution and is evaulated by Pressure Sensitive Tape Council (PSTC) methods and the results are as follows:

| | |
|---|---|
| PSTC No. 7 – 180° Shear (500 g wt) | 94 minutes |
| PSTC No. 1 – 180° Peel | 14 oz./inch |
| PSTC No. 6 – Rolling Back Tack | 1.1 inch. |

I claim:

1. A process for the preparation of low softening point resinous terpene polymer having a softening point in the range of approximately 0° C. to 85° C. which comprises: polymerizing 20 to 80 parts, by weight, of a terpene hydrocarbon monomer or mixtures of the same with 80 to 20 parts, by weight, of an oligomer of a cyclic monoterpene hydrocarbon in the presence of a Friedel-Crafts catalyst, and recovering a resinous terpene polymer having a softening point in the range of 0° C. and 85° C.

2. The process of claim 1 wherein said catalyst is aluminum chloride.

3. The process of claim 1 wherein said terpene monomer is beta-pinene.

4. The process of claim 1 wherein said terpene monomer is terpinolene.

5. The process of claim 1 wherein said terpene monomer is alpha-pinene.

6. The process of claim 1 wherein said terpene monomer is limonene.

TABLE II

| | Feed | | | Polymerization | Resin | Softening | Catalyst |
|---|---|---|---|---|---|---|---|
| Example | ACINTENE B | ACINTENE DP | Oligomer | Temp., ° C. | Yield, % | Point, ° C. | Used, % |
| 1 | 10 | 40 | 50 | 50 | 89 | 2 | 3 |
| 2 | 12 | 48 | 40 | 50 | 84.5 | 17 | 3 |
| 3 | 11 | 44 | 45 | 50 | 87 | 13 | 3 |
| 4 | 50 | | 50 | 45 | 103 | 41 | 3 |
| 5 | 10 | 40 Terpinolene | 50 | 40 | 86.4 | 10 | 3 |
| 6 | | 50 α-Pinene | 50 | 50 | 75.7 | <0 | 3 |
| 7 | | 50 Limonene | 50 | 50 | 83.5 | <0 | 3 |
| 8 | 10 | 40 | 50 | 50 | 94.2 | 32 | 3 |